(12) United States Patent
Kruchinin et al.

(10) Patent No.: US 7,987,254 B2
(45) Date of Patent: Jul. 26, 2011

(54) AUTOMATION NETWORK, REMOTE ACCESS SERVER FOR AN AUTOMATION NETWORK AND A METHOD FOR TRANSMITTING OPERATING DATA BETWEEN AN AUTOMATION SYSTEM AND A REMOTE COMPUTER

(75) Inventors: Andrei Kruchinin, St. Petersburg (RU); Igor Misyuchenko, St. Petersburg (RU)

(73) Assignee: Siemens Aktiengesellschaft, Munich (DE)

( * ) Notice: Subject to any disclaimer, the term of this patent is extended or adjusted under 35 U.S.C. 154(b) by 63 days.

(21) Appl. No.: 12/226,071

(22) PCT Filed: Apr. 7, 2006

(86) PCT No.: PCT/RU2006/000172
§ 371 (c)(1),
(2), (4) Date: May 7, 2009

(87) PCT Pub. No.: WO2007/117172
PCT Pub. Date: Oct. 18, 2007

(65) Prior Publication Data
US 2009/0319831 A1    Dec. 24, 2009

(51) Int. Cl.
*G06F 15/173* (2006.01)

(52) U.S. Cl. ......... 709/223; 709/224; 709/225; 709/226
(58) Field of Classification Search ............... 709/223
See application file for complete search history.

(56) References Cited

U.S. PATENT DOCUMENTS 6,151,625 A * 11/2000 Swales et al. ............... 709/218
2004/0193287 A1 * 9/2004 Lefebvre et al. ............... 700/1

FOREIGN PATENT DOCUMENTS

DE          102 45 176 A1    4/2004

* cited by examiner

*Primary Examiner* — John Follansbee
*Assistant Examiner* — Maceeh Anwari

(57) ABSTRACT

There is described an automation network, a remote access server for an automation network and a method for transmission of operating data between an automation system with one or more automation devices and a remote computer with the operating data of the automation device being transmitted via the Internet or an intranet and displayed and/or changed on the remote computer by an Internet browser. The remote access server provides the operating data for the remote computer and, for a session-oriented access, creates a software object as an image of the automation device and, if changes are to be made to the operating data by the access, a software object for simulation of the automation device and/or of the process to be controlled by the automaton device, so that any changes can be checked for permissibility and/or validity before being forwarded to the automation device.

19 Claims, 2 Drawing Sheets

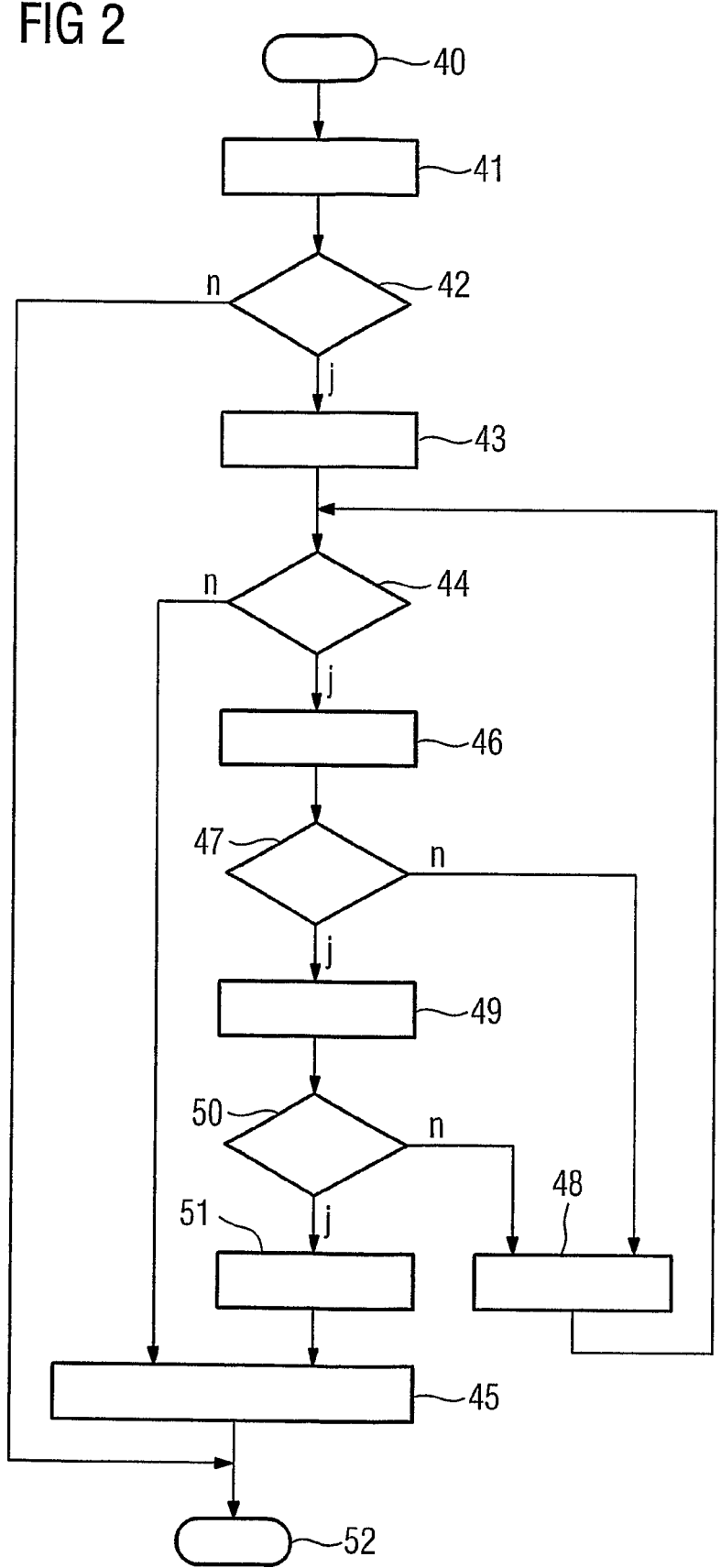

AUTOMATION NETWORK, REMOTE ACCESS SERVER FOR AN AUTOMATION NETWORK AND A METHOD FOR TRANSMITTING OPERATING DATA BETWEEN AN AUTOMATION SYSTEM AND A REMOTE COMPUTER

CROSS REFERENCE TO RELATED APPLICATIONS

This application is the US National Stage of International Application No. PCT/RU2006/000172, filed Apr. 7, 2006 and claims the benefit thereof. The International Application is incorporated by reference herein in its entirety.

FIELD OF INVENTION

The invention relates to an automation network with at least one automation device and at least one remote computer, a remote access server for an automation network and a method for transmission of operating data between an automation system and a remote computer.

BACKGROUND OF INVENTION

The term automation device is understood to be a device that processes a control program for controlling a process. Such devices are frequently known as programmable logic controllers (PLC) or controllers, or soft PLC. An automation device can be of modular construction and have a programmable central unit and intelligent modules that undertake individual automation functions, for example, weighing, axes control, closed-circuit control etc.. To connect to a communication network used to exchange data with other components of an automation network, such as network components or field units or other automation devices, an additional module, known as a communication processor, can be provided. Several automation devices participating in an automation project and networked with each other via a communication network are known as an automation system.

From U.S. Pat. No. 6,151,625 A, a programmable logic controller is known that has a web interface for communication via the Internet or intranet. In this way, a client/server system was created that offered operators a similar user-friendly user interface as general access services in the web. The web is a network of documents, also known as pages and stored on server computers distributed throughout the world. Normally a page contains text, multimedia offerings, such as graphic images, video or audio data as well as Hypertext links to other documents. A browser enables the user to read the pages and interactively select from the possibilities offered on the page. The browser is a graphics program that transmits the Internet requests to a page and displays information which are available on the page. The web interface integrated into the programmable logic controller enables a user to call up and display the operating data of the programmable logic controller by means of a browser. The operating data can be data on control configurations, process data such as input and output values, register states, statistical data, diagnostic data or configuration data of input-output interfaces. To operate and monitor the automation device with a Human Machine Interface (HMI), a remote computer with an Internet connection and a browser, for example Navigator from Netscape Communications or Internet Explorer from Microsoft, is sufficient.

SUMMARY OF INVENTION

The known arrangement for transmission of data between an automation device and a remote computer for operating and monitoring the automation device has the disadvantage that high data transmission rates are required on the communication network, particularly where video data is used. Furthermore, it is possible to make changes via the remote computer to the operating data of the automation system, that could jeopardize a secure operation or lead to damage to the controlling process. Even when intentional changes may lie within a permissible range for an individual automation device, unfavorable combinations with the operating data of other automation devices and the process environment can cause damage to the process to be controlled. A further disadvantage is to be seen in that access conflicts can occur if several remote computers want to access the operating data of the same automation device at the same time. A part of the computing power of the automation device is also taken up for communication with the remote computer. Therefore, it can occur in a disadvantageous manner that a remote computer wants to access the operating data of an automation device at a timepoint at which the particular automation device does not have sufficient free computing power available to communicate with the remote computer. An automation device that is accessible via the Internet to a remote computer also has the disadvantage that unauthorized access, hacker attacks, can be perpetrated against the automation device.

An object of the invention is therefore to provide an automation network, a remote access server for such an automation network and a method for transmission of operating data between an automation system and a remote computer, by means of which changes to the operating data of the automation system, that are made from a remote computer and could possibly be damaging to the process or the process control, can be avoided.

To achieve this objective, the automation network is provided with the features given in an independent claim. A corresponding remote access server for an automation network and a method for transmission of operating data between an automation system and a remote computer are described in further independent claims. Advantageous further developments of the invention are given in the dependent claims.

One or more automation devices are thus arranged downstream a remote access server, so that the communication of a remote computer must initially be carried out with the remote access server before changes to the operating data can affect the automation functions and the controlling process. The remote access server can be a device that is allocated to one or more automation devices, but separated from them. In an advantageous manner, the connection for data transmission between the automation device and remote access server can be designed as a network of automation field communication and be connected to several automation devices at this network. This has the advantage that an individual remote access server can be used for several automation devices. The remote access server can thus be used in a wide range of different network architectures and equally enables a data link to an automation device in the simplest architecture and operation in a network with several connected automation devices, i.e. an automation system.

As an alternative to this, it is of course also possible to integrate the remote access server as a component in an automation device or something called an Applet in the browser of the remote computer.

In the automation device, the task of the communication with the remote computer is separate from the actual control task. This leads to an improved, faster communication service for operators located distant from the automation device and has advantages for protecting the automation device from attacks. Access by a remote operator to the automation device is substantially accelerated because the remote access server is not engaged in the actual control task.

A software object as an image of the automation device is a simplified model of the real automation device that is called up by the remotely-located operator. The degree of detail of the model can depend on the access authorizations of the particular operator. Similarly, a software object with simulation of the automation device or of the process to be controlled by the automation device is a simplified model of the real industrial process to be controlled. Operating data from various automation devices and project information can be used to simulate the process behavior. The model of the process to be controlled by the automation device can be "comprehensive" or "small" or also "blank", depending on the access authorizations of the operator. In the latter case, the created software object does not include the simulation of the process to be controlled by the automation device. In an advantageous manner, the created software objects as an image of the automation device or for simulation of the automation device and/or of the process to be controlled by the automation device are essentially of a simpler design than models that are used for troubleshooting and testing the control software of automation devices. The software objects need merely to provide the operator with a general overview of comparatively few parameters of the automation device. For this purpose, the data of the software objects can be periodically updated by the automation device. The rate of updating for such software objects can, however, in an advantageous manner be set substantially lower than would be necessary for operating and monitoring functions.

The use of software objects in this case has the advantage that the scope of the interaction between the remote operator and the automation device can be scaled to a wide range. Pre-processing of data from several automation devices is thus possible, to create a view of the system for the remote operator.

The simplified models of the automation device and/or process can be session-oriented and created according to the access authorizations of the operator. In this way, the degree of modeling can be matched to the particular security and quality requirements. Visualization can be restricted to the details of the controlling process which are critical for the particular session.

If the inputs of the operator are impermissible, the software object can output a corresponding notice in an advantageous manner to the user as an image of the automation device or for simulation of the automation device and/or of the process to be controlled by the automation device.

If changes to the operating data of the automation device are buffer stored before being transmitted to the automation device by the remote access server, this has the advantage that a session-oriented access of the operator can be ended without the changes being effective on the real automation device.

If a software object created for simulation of the process to be controlled by the automation device is not cancelled at the end of the operator access, this has the advantage that it can be used for the purposes of system control, for example to create a short-term prognosis of the dynamic process behavior or to detect any dangerous process development. A continuous software object of this kind can be created at the instigation of the remote operator. A permanent software object as an image of the automation device in a similar manner can, for example, be used to back up the operating data of the automation device.

Furthermore, it is possible that a software object can itself after its reliability has been established, make changes to the process. The software object in this case undertakes actual control tasks.

Furthermore, the remote access server can be advantageously provided with a security unit by means of which operators wishing to access the operating data of automation devices behind the remote access server can be identified and authorized. The security checks therefore take place at a point before the automation devices and the automation devices locating behind it are therefore better protected against attacks. The operating programs of the remote access server can be designed to be safer against attacks than those of the automation device, because the remote access server does not perform any control functions. Moreover, various solutions can be used to identify and authorize users. It is possible in a simple manner to integrate further security devices in the remote access server. The security unit can be realized by a portal to the automation system that has a program permanently running on the remote access server and is responsible for identification, authentication and authorization of the remote operator. As one of many possible ways of realizing a deposit of credentials, as they are called, a list of devices the operating data of which can be accessed, a list of authorized operators, including their passwords and access authorizations can be stored in a service database. Additional information on other available network nodes, the computing power of which is not completely utilized and that can still undertake computing-intensive tasks, can be collected and stored in this database.

The availability of operating data can be limited in a simple manner to the particular existing access authorizations of an operator, if the remote access server has a list of services from which available services can be chosen depending on the authorization of the operator.

This list of services can, for example, be presented as an image of a production line with links to the individual production cells and the automation devices contained therein, that an operator can access via the remote access server. The advantage of this is that project information that is not present on an individual automation device is accessible to the user. By means of session-oriented visualization of selected details of the process to be controlled, the data traffic to be transmitted via the communication network during a session can also be reduced. A pre-processing of data from various automation devices provides the remote operator with a view of the production sequence controlled by an automation system.

The degree of detailing and the complexity of the software objects can be advantageously matched to the scope of the particular access if the software objects are created corresponding to the particular services.

By means of the simplified modeling of the automation device and of the process, and also due to the reduced updating rate, the data traffic and consumption of resources within the automation network, connected to a session-oriented access, is reduced.

Furthermore, in an advantageous manner, the remote access server can be designed in such way that other nodes of the automation network are monitored for the availability of unused computing power and software objects created on a node with sufficient existing, free computing power. An agent for resource monitoring, located on the remote access server and/or the node, as a program permanently running in the background, can be created for this purpose. This is responsible for updating the information stored in the service database, regarding the unused computing power of the nodes arranged in the automation network. By better use of the computing power present in the automation network, a fast reaction to session-oriented access is enabled, even if the computing power of the automation device to which access is required is engaged in other tasks.

If an operator wants to carry out a test and a fault rectification or a video-supported operation on an automation system, this requires a higher rate of data flow to the remote computer. In this case, it is possible to use protocols on the intranet or Internet with a high data throughput. For example, a high data throughput with the known Realtime Transport Protocol (RTP) with realtime protocol conversion on the remote access server can be achieved. A plug-in to enable the high data rate to be realized is used in the standard browser of the remote computer for this purpose.

BRIEF DESCRIPTION OF THE DRAWINGS

Using the drawings showing an example of an embodiment of the invention, configurations and advantages are explained in more detail in the following.

The illustrations are as follows.

FIG. 2 A flow diagram of a session-oriented access through a remote computer.

DETAILED DESCRIPTION OF INVENTION

Figure 1:
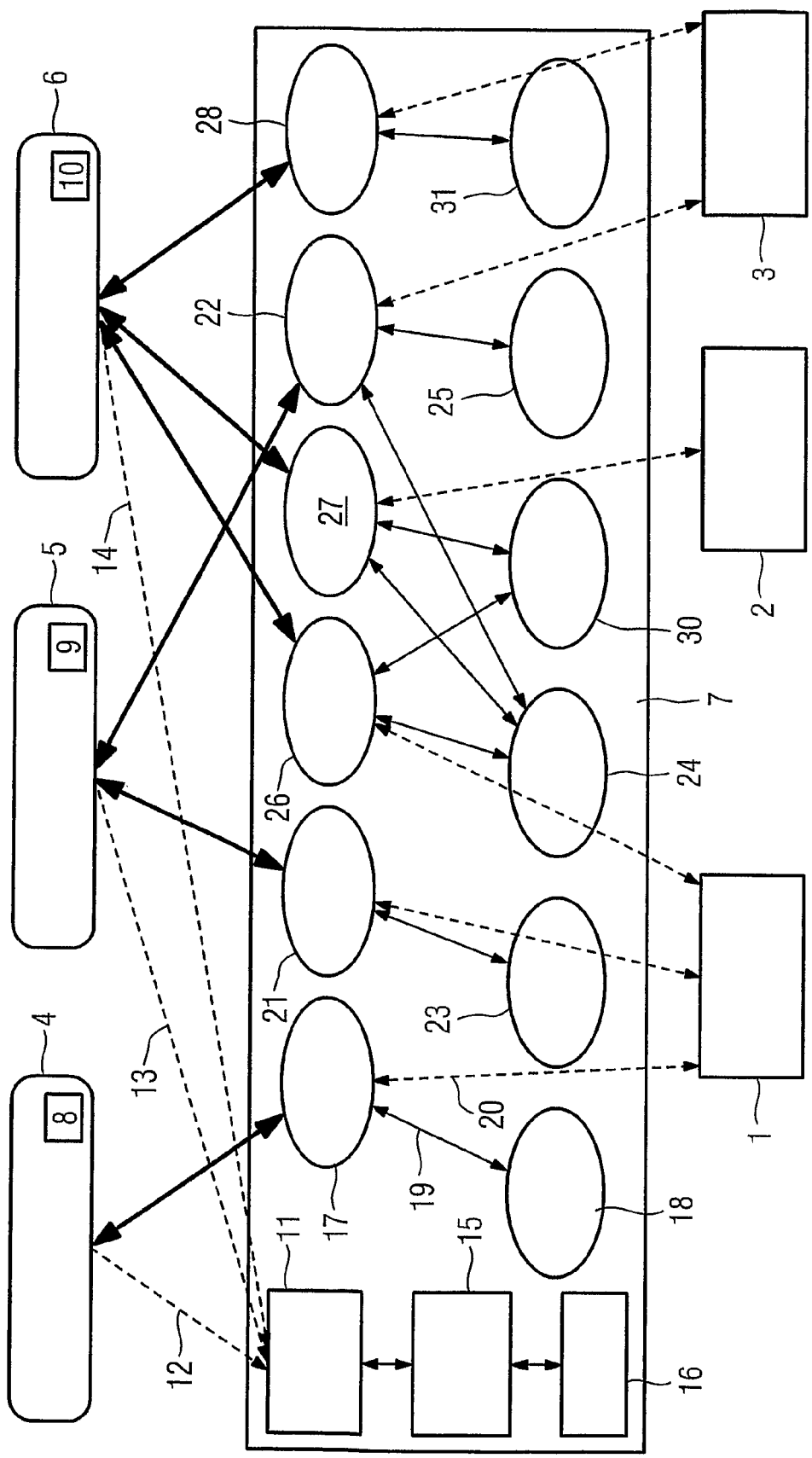
FIG. 1 An automation network with a remote access server.

In the example of an embodiment shown, an automation network has three automation devices 1, 2 and 3 and three remote computers 4, 5 and 6 that are connected to each other via the Internet or an intranet as a communication network. The topology of the communication network can moreover be configured as required. Access by the remote computer 4, 5 or 6 to operating data of the automation devices 1, 2 or 3 takes place via a remote access server 7, that for example can be formed as an additional device in the automation network. As an alternative to this, it is possible to realize the remote access server by a permanently running software module that is located at any node of the automation network. The remote computers 4, 5 and 6 are each provided with a web browser 8, 9 or 10 to display the operating data on the remote computer 4, 5 or 6. The function of the remote access server 7 is similar to that of a gateway arranged between the Internet and the local area network (LAN). Accesses of the remote computers 4 . . . 6 are initially controlled by something called a control system portal 11, as shown by arrows 12, 13 and 14, indicated by broken lines. By means of a service database 15, the access authorizations are checked by the portal 11. The portal 11 is responsible for identification, authentication and authorization of a user who wants to gain access via one of the remote computers 4, 5 or 6. For this purpose, authorization rights stored in the service database 15 in a list of authorized users, with their passwords, is checked to determine whether the particular operator is authorized to make the required access. The nodes of the automation network on which unused computing power is available are also stored in the service database 15. It is thus possible to react comparatively quickly to access requests because bottlenecks due to computing power can be almost completely precluded. The monitoring of free resources is carried out by an agent 16 that belongs to the remote access server 7 and continuously updates the service database 15. For a clear representation of the services available, there is also a list of services on the remote access server 7, that consists of a block diagram of the production line with links to the individual production cells and to the automation devices that can be reached via the remote access server 7. This diagram can be realized by a web page, displayed by means of accesses 12, 13, 14 to the portal 11 with the aid of browser 8, 9, 10. Accesses to operating data of the automation devices 1 . . . 3 are processed, session oriented, in the remote access server 7. For example with an access 12 of the remote computer 4 to operating data of the automation device 1, the portal 11, after checking the necessary access authorizations, creates a software object 17 as an image of the automation device 1 and a software object 18 for simulation of the automation device 1 and the process controlled by the automation device 1. As shown by an arrow 19, a data exchange takes place between the software objects 17 and 18 for validation, i.e. for checking the validity of changes carried out to operating data. Only after validation do the changes become effective by transmission to the automation device 1 as shown by arrow 20. This avoids impermissible changes being made to operating data and damage that could occur to the controlling process. After creation of the software object 17, the data exchange takes place between the remote computer 4 and only the software object 17, because it contains an image of the operating data of the automation device 1. The operating security of the automation device 1 is improved in this way. The complexity and degree of detailing of the software objects 17 and 18 depend on the particular access authorizations and the extent of the intended changes or requests for operating data. It can therefore be a comparatively simple model of the automation device and the process to be controlled. The data of the automation device 1 required in the modeling is periodically updated. The updating rate required for this is essentially lower than for normal operating and monitoring systems. In a corresponding manner to access 12, with access 13 by the remote computer 5 a software object 21 as an image of the automation device 1, a software object 22 as an image of the automation device 3, a software object 23 and a software object 24 for simulation of the automation device 1 and of the process to be controlled by the automation device 1 and a software object 25 for simulation of the automation device 3 and the process to be controlled by the automation device 3 is created. In the same way, in the event of an access 14 by the remote computer 6 to the portal 11, software objects 26, 27 and 28 are created as images of the automation devices 1, 2 or 3 and software objects 30 and 31 for simulation of the automation devices 2 and 3 and the processes controlled by these. When accesses 12 . . . 14 by remote computers 4 . . . 6 are completed, the software objects 17, 18, 21 . . . 28, 30, 31 created to process the accesses are again cancelled, to release the required computing power.

The sequence of an access by a remote computer to operating data of an automation device or an automation system consisting of several devices is explained in more detail in the following with the aid of the flow diagram in FIG. 2. Access begins at step 40 with an access request by a remote computer to a portal of a remote access server. In step 41, the portal receives the access request, identifies and authenticates the operator that made the access request and allocates him/her the access authorizations that are stored in a database. During an enquiry 42, the access authorizations are checked to determine whether they are sufficient for the required extent of the access. If this is not the case, the process ends here. Otherwise, a transition to step 43 takes place in which the portal specifies the distribution of the necessary software objects to nodes of the automation network and creates the accorded access rights corresponding to the called-up automation devices. The session-oriented access is then switched to the created software objects. If absolutely no changes to the operating data are intended during an access request, a direct transition through a branch 44 to step 45 takes place, in which after completion of the access, the software objects created for the access are again deleted. If changes are intended, a transition to step 46 takes place in which additional software objects for simulation of the called-up automation devices and/or the process to be controlled by the automation device are created. In an enquiry 47, a check is first performed to determine whether the intended changes to the operating data lie within a permissible range. If this is not the case, then in step 48 a notice is output to the operator that the change to the operating data is not permissible. The operator can then correct his/her inputs and a return to branch 44 takes place. If, however, the intended changes are within a permissible range, a simulation with the changed operating data is carried out in step 49 by the created software objects. This simulation serves to validate the changes. If the simulation shows that the intended changes to the operating data are invalid, for example would lead to damage to the controlling process, a skip in branch 50 to step 48 takes place in which a corresponding notice is output to the operator. If on the other hand the intended changes prove to be valid, the new operating data is transferred in steps 51 to a waiting queue, containing any other existing changed operating data for transmission to the relevant automation device(s). After the requested changes to the operating data have been carried out by the relevant automation devices, the software objects created for the session-oriented access are cancelled in step 45 and the process ends in step 52. The resources required for the access are thus released.

The invention claimed is:

1. An automation network, comprising:
   a plurality of automation devices, each automation device comprising a control program having operating data for controlling a process;
   one or more remote computers for providing remote access to one or more of the plurality of automation devices for making changes to the operating data of the control program;
   a remote access server located between the plurality of automation devices and the one or more remote computers for controlling access to the plurality of automation devices, wherein the remote access server is configured to initiate and manage a session-oriented access between the one or more remote computers and the plurality of automation devices, by:
   (a) receiving a request for access to a requested automation device of the one or more of the plurality of automation devices from a requesting computer of the one or more remote computers and initiating the session-oriented access using computing resources determined to be available;
   (b) creating a software object as an image of the requested automation device comprising a model of the requested automation device;
   (c) when changes to the operating data are intended by the session-oriented access, creating a further software object, wherein the further software object models the process with the intended changes to allow for a simulation of the process with the intended changes,
   (d) running the simulation of the process with the intended changes;
   (e) determining if the simulation of the process with the intended changes is valid;
   (f) transmitting the intended changes to the requested automation device to update the operating data only if determined to be valid, such that any changes are checked before forwarding to the automation device; and
   (g) terminating the session-oriented access and releasing the computing resources.

2. The automation network as claimed in claim 1, wherein the operating data are displayed on the remote computer by an Internet browser.

3. The automation network as claimed in claim 1, wherein the changes are checked for permissibility prior to running the simulation and notice is provided if the changes are not permissible.

4. The automation network as claimed in claim 1, wherein the changes are checked for permissibility prior to running the simulation and the simulation is run only if the changes are permissible.

5. The automation network as claimed in claim 1, wherein a degree of modeling of the further software object is matched to a particular security and quality requirement with visualization restricted to critical details.

6. The automation network as claimed in claim 1, wherein a degree of modeling of the software object is matched to a particular security and quality requirement with visualization restricted to critical details.

7. The automation network as claimed in claim 1, wherein the remote access server has a security unit for identification and authorization of operators accessing the operating data of the automation device.

8. The automation network as claimed in claim 7, wherein the remote access server contains a list of services from which available services are chosen according to the authorization of the operator.

9. The automation network as claimed in claim 8, wherein the software objects are created corresponding to the particular available services.

10. The automation network as claimed in claim 1, wherein the remote access server monitors nodes of the automation network for availability of unused computing power and to create software objects on a node with sufficient unused computing power.

11. The automation network as claimed in claim 9, wherein the remote access server monitors nodes of the automation network for availability of unused computing power and to create software objects on a node with sufficient unused computing power.

12. The automation network as claimed in claim 1, wherein functions of the automation network are carried out on a plurality of nodes of the automation network for a distributed realization of the remote access server.

13. The automation network as claimed in claim 1, wherein functions of the automation network are carried out on a plurality of nodes of the automation network for a redundant realization of the remote access server.

14. A remote access server for an automation network, wherein the automation network has an plurality of automation devices, each comprising a control program having operating data for controlling a process and one or more remote computers for providing remote access to one or more of the plurality of automation devices for making changes to the operating data of the control program, the remote access server located between the plurality of automation devices and the one or more remote computers for controlling access to the plurality of automation devices, the remote access server configured to initiate and manage a session-oriented access between the one or more remote computers and the plurality of automation devices, by:
   (a) receiving a request for access to a requested automation device of the one or more of the plurality of automation devices from a requesting computer of the one or more remote computers and initiating the session-oriented access using computing resources determined to be available;

(b) creating a first software object as an image of the requested automation device comprising a model of the requested automation device;

(c) creating a second software object when changes to the operating data are intended by the session-oriented access, wherein the second software object models the process with the intended changes to allow for a simulation of the process with the intended changes;

(d running the simulation of the process with the intended changes;

(e) determining if the simulation of the process with the intended changes is valid;

(f) transmitting the intended changes to the requested automation device to update the operating data only if determined to be valid; and (g) terminating the session-oriented access and releasing the computing resources.

15. A method for session-oriented access between one or more remote computers and a plurality of automation devices, each automation device comprising a control program having operating data for controlling a process, in an automation system, comprising:

(a) receiving by a remote access server a request for access to a requested automation device of the one or more of the plurality of automation devices from a requesting computer of the one or more remote computers and initiating the session-oriented access using computing resources determined to be available;

(b) creating a first software object as an image of the requested automation device comprising a model of the requested automation device;

(c) creating a second software object when changes to the operating data are intended by the session-oriented access, wherein the second software object models the process with the intended changes to allow for a simulation of the process with the intended changes;

(d) running the simulation of the process with the intended changes;

(e) determining if the simulation of the process with the intended changes is valid;

(f) transmitting the intended changes to the requested automation device to update the operating data only if determined to be valid; and (g) terminating the session-oriented access and releasing the computing resources.

16. The method as claimed in claim 15, wherein the changes are checked for permissibility prior to running the simulation and the simulation is run only if the changes are permissible.

17. The method as claimed in claim 15, wherein the changes are checked for permissibility prior to running the simulation and notice is provided if the changes are not permissible.

18. The method as claimed in claim 15, wherein the operating data are displayed on the remote computer via an Internet browser.

19. The method as claimed in claim 15, wherein the operating data are changed via the remote computer via an Internet browser.

* * * * *